US011993222B2

United States Patent
Mitsunabe et al.

(10) Patent No.: US 11,993,222 B2
(45) Date of Patent: May 28, 2024

(54) IGNITER ASSEMBLY AND GAS GENERATOR PROVIDED WITH SAME

(71) Applicant: DAICEL CORPORATION, Osaka (JP)

(72) Inventors: Atsushi Mitsunabe, Tokyo (JP); Shinya Yamamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 50 days.

(21) Appl. No.: 17/924,498

(22) PCT Filed: May 10, 2021

(86) PCT No.: PCT/JP2021/017691
§ 371 (c)(1),
(2) Date: Nov. 10, 2022

(87) PCT Pub. No.: WO2021/230197
PCT Pub. Date: Nov. 18, 2021

(65) Prior Publication Data
US 2023/0271586 A1    Aug. 31, 2023

(30) Foreign Application Priority Data

May 14, 2020    (JP) .................................. 2020-085501

(51) Int. Cl.
*B60R 21/26*     (2011.01)
*B60R 21/264*    (2006.01)

(52) U.S. Cl.
CPC .............................. *B60R 21/2644* (2013.01); *B60R 2021/26029* (2013.01)

(58) Field of Classification Search
CPC .................. B60R 21/2644; B60R 2021/26029
(Continued)

(56) References Cited

U.S. PATENT DOCUMENTS

2022/0276030 A1 *  9/2022  Yamamoto ................ F42B 3/04

FOREIGN PATENT DOCUMENTS

EP           1936320 A1 *  6/2008  .............. F42B 3/198
JP        2001165600 A  *  6/2001  .............. F42B 3/103
(Continued)

OTHER PUBLICATIONS

International Search Report for International Application No. PCT/JP2021/017691, dated Jul. 6, 2021, with an English translation.
(Continued)

*Primary Examiner* — Jonathan C Weber
(74) *Attorney, Agent, or Firm* — Birch, Stewart, Kolasch & Birch, LLP (57) ABSTRACT

A technique of improving pressure resistance performance of an igniter assembly is provided. The igniter assembly includes an igniter body including an ignition portion filled with an igniting charge and an electro-conductive portion extending from the ignition portion, an igniter collar including a tubular peripheral wall portion that surrounds at least the electro-conductive portion of the igniter body, and a resin molded article that is interposed between the igniter body and the igniter collar and integrates the igniter body and the igniter collar. The igniter collar includes a first support portion that is provided in an inner peripheral portion of the peripheral wall portion and is formed in a convex shape toward an inner side of the peripheral wall portion in a radial direction and thus buried in the resin molded article and a second support portion that is provided at a position in the inner peripheral portion proximal to the first support portion from the ignition portion in a direction along a center axis of the peripheral wall portion and is formed in a convex shape toward the inner side of the peripheral wall portion in the radial direction and thus buried in the resin molded article or formed in a concave shape
(Continued)

toward an outer side of the peripheral wall portion in the radial direction and thus filled with the resin molded article.

5 Claims, 6 Drawing Sheets

(58) Field of Classification Search
USPC .......................................................... 102/530
See application file for complete search history.

(56) References Cited

FOREIGN PATENT DOCUMENTS

| | | | | | |
|---|---|---|---|---|---|
| JP | 2002054895 | A | * | 2/2002 | .............. F42B 3/103 |
| JP | 2006234369 | A | * | 9/2006 | .............. F42B 3/103 |
| JP | 2009133514 | A | * | 6/2009 | |
| JP | 2015-157586 | A | | 9/2015 | |

OTHER PUBLICATIONS

Written Opinion of the International Searching Authority for International Application No. PCT/JP2021/017691, dated Jul. 6, 2021, with an English translation.

* cited by examiner

IGNITER ASSEMBLY AND GAS GENERATOR PROVIDED WITH SAME

FIELD

The present disclosure relates to an igniter assembly in which an electric ignition igniter body is attached to an igniter collar and a gas generator provided with the same.

BACKGROUND

In an igniter assembly including an electric ignition igniter body, the igniter body is fixed by resin to an igniter collar formed of metal. The igniter assembly is then attached to an airbag gas generator through an igniter collar and is widely used. Patent Document 1 discloses a gas generator in which an igniter is fixed by a resin molded portion to a fixing member and a lower side shell made of metal.

CITATION LIST

[Patent Document]
[Patent Document 1] JP 2015-157586 A

SUMMARY

Technical Problem

When the igniter assembly is attached to the gas generator, a force acts on the igniter assembly due to an impact produced upon actuation of the igniter body. In a configuration in which the igniter collar and the igniter body are integrated by resin, when a force acts on a portion formed by the resin and produces a crack in the portion, part of the portion formed by the resin may fall out from the igniter assembly.

In view of the above problem, an object of the present disclosure is to provide a technique of improving pressure resistance performance of an igniter assembly.

Solution to Problem

To solve the problem described above, an igniter assembly according to an embodiment of the present disclosure provides, on a peripheral wall portion of an igniter collar, a first support portion and a second support portion are provided at a position proximal to the first support portion from an ignition portion.

Specifically, an embodiment of the present disclosure is an igniter assembly including an igniter body including an ignition portion filled with an igniting charge and an electro-conductive portion extending from the ignition portion, an igniter collar including a tubular peripheral wall portion that surrounds at least the electro-conductive portion of the igniter body, and a resin molded article that is interposed between the igniter body and the igniter collar and integrates the igniter body and the igniter collar. The igniter collar includes a first support portion that is provided in an inner peripheral portion of the peripheral wall portion and is formed in a convex shape toward an inner side of the peripheral wall portion in a radial direction and thus buried in the resin molded article and a second support portion that is provided at a position in the inner peripheral portion proximal to the first support portion from the ignition portion in a direction along a center axis of the peripheral wall portion and is formed in a convex shape toward the inner side of the peripheral wall portion in the radial direction and thus buried in the resin molded article or formed in a concave shape toward an outer side of the peripheral wall portion in the radial direction and thus filled with the resin molded article. A minimum dimension of the first support portion in the direction along the center axis is equal to or larger than a minimum dimension of the second support portion in the direction along the center axis.

In the igniter assembly, an impact upon actuation of the igniter body is likely to produce a crack in the thinnest portion of the resin molded article. If the crack is produced in the resin molded article, the igniter assembly supports part of the resin molded article on an ignition portion side from the crack by using the first support portion and supports part of the resin molded article on a tip side of the electro-conductive portion from the crack by using the second support portion. This allows the igniter assembly according to an embodiment of the present disclosure to prevent part of the resin molded article from falling out from the igniter assembly even if the resin molded article is split due to a crack produced therein, allowing the pressure resistance performance to be improved.

In the igniter assembly described above, a connector connection space in which a connector that transmits an actuation signal for the igniter body is to be connected to the electro-conductive portion may be formed on a tip side of the electro-conductive portion from the first support portion in the direction along the center axis, and the second support portion may be formed in a convex shape toward the inner side of the peripheral wall portion in the radial direction and thus buried in the resin molded article and formed at a position facing the connector connection space. In the igniter assembly, the connector connection space easily has predetermined dimensions in the radial direction of the peripheral wall portion of the igniter collar and in the direction along the center axis. The igniter assembly with this configuration easily has, due to the connector connection space, a space for forming the second support portion protruding toward the inner side of the peripheral wall portion of the igniter collar in the radial direction.

In the igniter assembly described above, a plurality of the second support portions may be discontinuously formed along a circumferential direction of the peripheral wall portion. The plurality of second support portions discontinuously formed along the circumferential direction of the peripheral wall portion allows the igniter assembly to prevent the resin molded article from rotating relative to the igniter collar after the resin molded article is cured.

In addition, the present disclosure is a gas generator and may include an outer shell container including a gas release opening and the igniter assembly described above disposed in the outer shell container. The igniter assembly according to an embodiment of the present disclosure can be used for the gas generator.

In the gas generator described above, the outer shell container may be formed by combining a first shell and a second shell, part of either the first shell or the second shell may be the igniter collar, and the igniter assembly may be fixed by the resin molded article to the first shell or the second shell part of which is the igniter collar. In this manner, part of the outer shell container may be formed as the igniter collar.

Advantageous Effects of Invention

The technique of the present disclosure can improve the pressure resistance performance of an igniter assembly.

DESCRIPTION OF EMBODIMENTS

An igniter assembly and a gas generator including the igniter assembly according to embodiment of the present disclosure will be descried below with reference to the drawings. It should be noted that the respective configurations and the combinations thereof in the respective embodiments are only examples, and the configurations may be added, omitted, substituted, or otherwise modified as appropriate within a scope that does not depart from the spirit of the present disclosure. The present disclosure is not limited by the embodiments and is limited only by the claims.

First Embodiment

Figure 1:
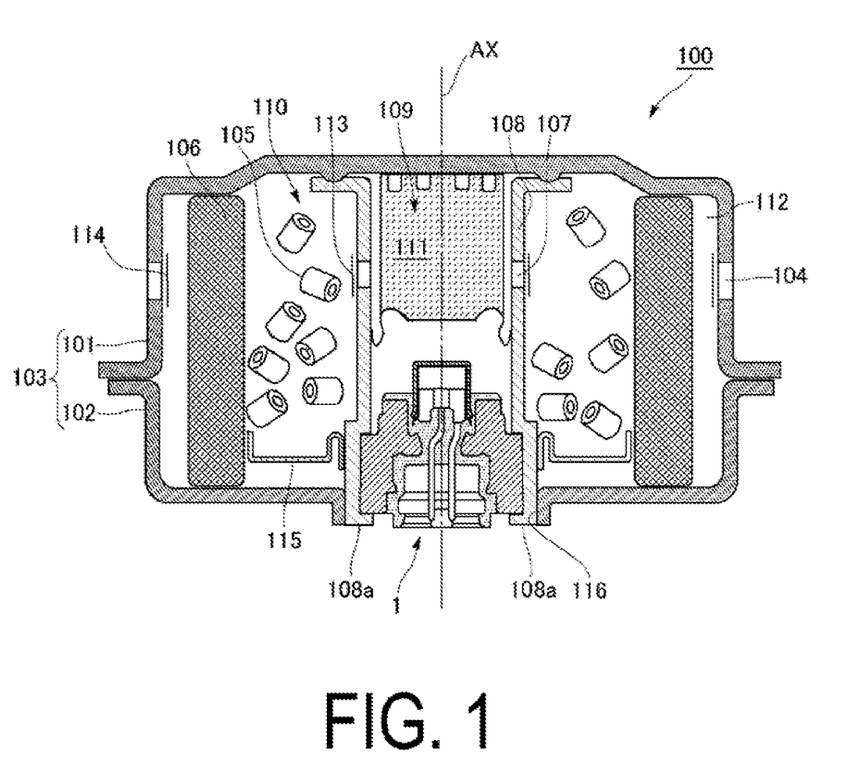
FIG. 1 is a diagram illustrating a schematic configuration of a gas generator including an igniter assembly according to a first embodiment.

FIG. 1 is an axial cross-sectional view of an airbag gas generator (hereinafter, referred to as a "gas generator") 100 using an igniter assembly 1 according to a first embodiment. In FIG. 1, a center axis AX of the gas generator 100 is indicated by a dashed-dotted line. Note that the gas generator 100 is not limited to a gas generator used for an airbag, may have a known shape suitable for a seatbelt pre-tensioner or a curtain airbag, or may have a known shape that is used for various types of actuators or the like. The gas generator 100 includes an upper shell 101 (an example of a "first shell" in the present application) and a lower shell 102 (an example of a "second shell" in the present application). The upper shell 101 and the lower shell 102 are made of metal and have a bottomed substantially cylindrical shape. Furthermore, a plurality of gas release openings 104 is formed side by side in a circumferential direction in the upper shell 101. In the gas generator 100, the upper shell 101 and the lower shell 102 are joined with open ends of these shells facing each other, thus forming a housing 103 (an example of "outer shell container" in the present application) having a short tubular shape with both ends in an axial direction closed. The igniter assembly 1 is disposed within this housing 103. Note that, before the igniter assembly 1 is actuated, the gas release opening 104 is closed from the inside of the housing 103 by aluminum sealing tape 114. Although the igniter assembly 1 will be described in detail later, a gas generating agent 105 filled in the housing 103 is ignited and combusted by actuation of an igniter body 2 provided in the igniter assembly 1 (see FIG. 2) to generate combustion gas to inflate, for example, an airbag (bag).

In the gas generator 100, an inner tubular member 108 is disposed at the center in the housing 103. The peripheral wall of the inner tubular member 108 is provided with a plurality of flame transferring holes 107. A space 109 configured to accommodate the igniter assembly 1 and the transfer charge 111 is formed on the inner side of the inner tubular member 108. The flame transferring holes 107 are closed by a sealing tape 113 made of aluminum. This increases an air tightness inside the inner tubular member 108.

In addition a combustion chamber 110 configured to accommodate the gas generating agent 105 is formed on the outer side of the inner tubular member 108 in the radial direction. In the combustion chamber 110, the gas generating agent 105 is supported by an under plate 115 formed in a substantially ring-like shape. As the transfer charge 111, a gas generating agent having favorable ignitability and a combustion temperature higher than that of the gas generating agent 105 may be used. The combustion temperature of the transfer charge 111 preferably ranges from 1700 to 3000° C. As for such a transfer charge 111, a known material including, for example, nitroguanidine (34 wt. %) and strontium nitrate (56 wt. %) can be used. Alternatively, a known black gunpowder (boron saltpeter) may be used as the transfer charge. Furthermore, as for the gas generating agent 105, a gas generating agent having a relatively low combustion temperature can be used. It is desirable that the combustion temperature of the gas generating agent 105 falls, for example, in a range from 1000 to 1700° C. A known material containing guanidine nitrate (41 wt. %), basic copper nitrate (49 wt. %), a binder and an additive can be used.

In addition, the igniter assembly 1 is fixed at the lower shell 102 side of the inner tubular member 108. Specifically, an attachment hole 116 is provided in a center portion of a bottom portion of the lower shell 102. The igniter assembly 1 is inserted into the inner tubular member 108, in a state where the open end portion 108a of the inner tubular member 108 is exposed to the outside of the lower shell 102 through the attachment hole 116. By crimping the open end portion 108a side of the inner tubular member 108, an igniter collar 3 (see FIG. 2) of the igniter assembly 1 can be fixed. Furthermore, the inner tubular member 108 is connected by welding or the like to the lower shell 102 in the vicinity of the open end portion 108a on the side where the igniter assembly 1 is accommodated.

The gas generating agent 105 is accommodated in the combustion chamber 110, and a filter 106 is arranged on the outside thereof. The filter 106 collects a combustion residue contained in combustion gas generated by combustion of the gas generating agent 105, and cools the combustion gas. The filter 106 is formed in a tubular shape using a laminated metal mesh or the like, and has an outer peripheral surface arranged to face an inner peripheral surface of the housing 103. A gap 112 that is to serve as a gas flow path is formed between the outer peripheral surface of the filter 106 and the inner peripheral surface of the housing 103. This makes it possible to utilize the entire surface of the filter 106.

In the gas generator 100 configured in this manner, upon actuation of the igniter assembly 1, the transfer charge 111 disposed in a vicinity thereof is ignited and combusts. Flame generated by the ignition and combustion is discharged into the combustion chamber 110 through the flame transferring holes 107 formed in the inner tubular member 108. With this flame, the gas generating agent 105 in the combustion chamber 110 is ignited and combusts, and thus combustion gas is generated. The combustion gas is cleaned and cooled while passing through the filter 106, breaks through the sealing tape 114 closing the gas release opening 104, and then discharged to the outside through the gas release opening 104.

Figure 2:
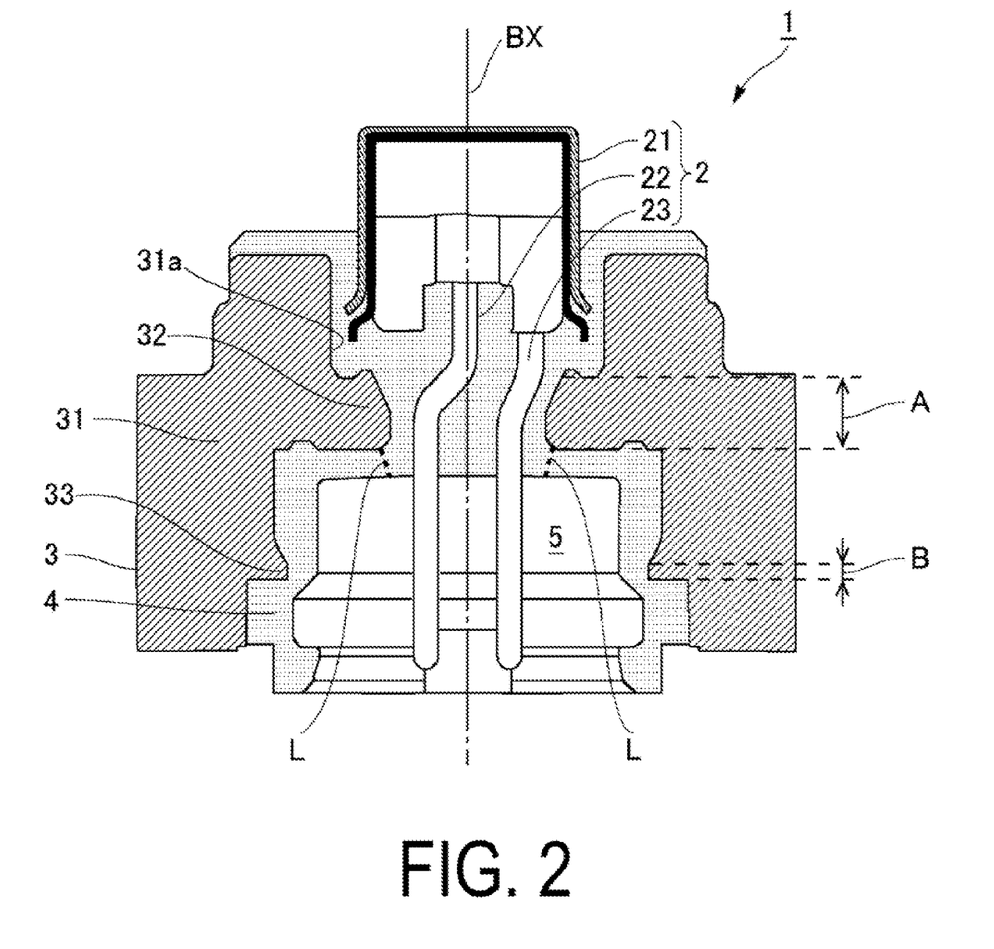
FIG. 2 is a diagram illustrating a schematic configuration of the igniter assembly according to the first embodiment.

Next, an igniter assembly 1 according to the present embodiment will be described with reference to FIG. 2. FIG. 2 is an axial cross-sectional view of the igniter assembly 1 according to the present embodiment. In FIG. 2, a center axis BX of the igniter assembly 1 is represented by a dashed-dotted line. As illustrated in FIG. 1, the center axis BX of the igniter assembly 1 coincides with the center axis AX of the gas generator 100 in a state where the igniter assembly 1 is attached to the gas generator 100. In the following description, the direction along the center axis BX of the igniter assembly 1 is referred to as a vertical direction of the igniter assembly. Upward of the paper surface of FIG. 2 is referred to as an upper side of the igniter assembly 1. Downward of the paper surface of FIG. 2 is referred to as a lower side of the igniter assembly 1.

The igniter assembly 1 includes the igniter body 2 as illustrated in FIG. 2. The igniter body 2 includes an ignition portion 21 filled with the igniting charge, and electro-conductive pins 22, 23 (an example of "electro-conductive portions" in the present application) extending from the ignition portion 21. The igniter body 2 is of an electric igniting type configured to cause an igniting charge within the ignition portion 21 to combust using ignition current supplied from the electro-conductive pins 22, 23.

The ignition portion 21 has a cup in which a space configured to accommodate the igniting charge is defined. The ignition portion 21 is disposed such that the portion corresponding to the bottom portion of the cup is positioned on the discharge direction side of the combustion product of the igniting charge when the igniter body 2 is actuated. For example, the igniter assembly 1 is disposed within the housing 103 in a manner such that the portion corresponding to the bottom portion of the cup faces a filling position of the transfer charge 111, as illustrated in FIG. 1. With this configuration, in a case where the igniter body 2 of the igniter assembly 1 is actuated, the combustion product from the igniting charge can be discharged toward the transfer charge 111 to ignite and burn the transfer charge 111.

The pair of electro-conductive pins 22, 23 are electrically insulated from each other, and a bridge wire (not illustrated) is bridge-connected between the pins within the ignition portion 21. The igniting charge accommodated in the ignition portion 21 is in contact with the bridge wire (not illustrated) bridge-connected between the electro-conductive pins 22, 23. The igniting charge is ignited and burnt by the heat generated from the bridge wire. This generates a combustion product. In this manner, the igniter body 2 causes the igniting charge to combust, and the combustion product of this is discharged.

The igniter assembly 1 includes the igniter collar 3 made of metal. The igniter collar 3 has a tubular peripheral wall portion 31 surrounding the igniter body 2. The center axis of the peripheral wall portion 31 matches the center axis BX of the igniter assembly 1. The inner diameter of the peripheral wall portion 31 is set to be larger than the outer diameter of the ignition portion 21 of the igniter body 2. In the present embodiment, in the direction along the center axis (center axis BX) of the peripheral wall portion 31, the peripheral wall portion 31 of the igniter collar 3 surrounds a portion of the igniter body 2 from a part more on the lower side than approximately the middle of the ignition portion 21 to a tip side of the electro-conductive pins 22, 23. It suffices if the peripheral wall portion 31 is formed to have a dimension large enough to at least surround the electro-conductive pins 22, 23, and is arranged to surround at least the electro-conductive pins 22, 23.

The igniter assembly 1 includes a resin molded article 4 that is disposed between the igniter body 2 and the igniter collar 3. The igniter body 2 and the igniter collar 3 are integrated by the resin molded article 4. In a manufacturing process for the igniter assembly 1, the resin molded article 4 is formed by injection molding using a resin material, to be continuously provided between the igniter body 2 and the igniter collar 3. As the resin material for forming the resin molded article 4, it is possible to preferably use a resin material having, after curing, excellent heat resistance, durability, corrosion resistance, and the like. Examples of such resin material include: thermoplastic resins such as polybutylene terephthalate resin, polyethylene terephthalate resin, polyamide resin, polypropylene sulfide resin, and polypropylene oxide resin; and thermosetting resins such as epoxy resin. Note that the resin molded article 4 may be formed in a manner such that the resin molded article 4 surrounds the entire periphery of the ignition portion 21.

The igniter collar 3 includes a first support portion 32 that is provided in an inner peripheral portion 31a of the peripheral wall portion 31, and is formed in a convex shape toward the inner side of the peripheral wall portion 31 in the radial direction and thus buried in the resin molded article 4. The igniter collar 3 is integrally formed with the first support portion 32 by casting. The first support portion 32 is formed continuously along the circumferential direction of the peripheral wall portion 31. The first support portion 32 extends to a position to overlap the ignition portion 21 on the lower side of the ignition portion 21 of the igniter body 2, as viewed in a direction along the center axis BX. Thus, the outer diameter of the ignition portion 21 is larger than the inner diameter of the first support portion 32. By providing such a first support portion 32, the igniter assembly 1 is configured to disable the passage of the ignition portion 21 of the igniter body 2 to the lower side of the first support portion 32. Thus, the ignition portion 21 can be prevented from passing through the first support portion 32 to fall out from the lower side of the igniter collar 3 even when the resin molded article 4 is softened and the downward force acts on the igniter assembly 1 due to an increase the pressure and temperature on the upper side (in the inner tubular member 108 illustrated in FIG. 1) of the igniter assembly 1 by actuation of the igniter body 2. Note that, as long as the passage of the ignition portion 21 can be prevented, a plurality of the first support portions 32 may be formed discontinuously in the circumferential direction.

The igniter collar 3 further includes a second support portion 33 that is provided at a position in the inner peripheral portion 31a proximal to the first support portion 32 from the ignition portion 21 in a direction along the center axis of the peripheral wall portion 31 and is formed in a convex shape toward the inner side of the peripheral wall portion 31 in the radial direction and thus buried in the resin molded article 4. The second support portion 33 is formed to be shorter than the first support portion 32 in the radial direction of the peripheral wall portion 31. Thus, the second support portion 33 is formed with a length of the part protruding toward the inner side of the peripheral wall portion 31 in the radial direction shorter than that of the first support portion 32. The second support portion 33 is formed integrally with the igniter collar 3, by pushing in a mold from the lower side of the igniter collar 3, in such a manner as to scrape the igniter collar 3. A plurality of the second support portions 33 is formed discontinuously along the circumferential direction of the peripheral wall portion 31. With the plurality of second support portions 33 discontinuously formed along the circumferential direction of the peripheral wall portion 31 in the igniter assembly 1, the resin molded article 4 can be prevented from rotating relative to the igniter collar 3 after the resin molded article 4 is cured.

On the lower side (tip side), the electro-conductive pins 22, 23 is exposed, and the resin molded article 4 forms a connector connection space 5 to which a connector (not illustrated) for transmitting an actuation signal for the igniter body 2 to the electro-conductive pins 22, 23 is connectable. Part of the resin molded article 4 forming the connector connection space 5 is formed integrally with part of the resin molded article 4 surrounding the ignition portion 21 on the upper side from the first support portion 32. When the connector is inserted in the connector connection space 5, the connector is connected to the electro-conductive pins 22, 23. The connector connection space 5 is formed on the tip side of the electro-conductive pins 22, 23 from the first support portion 32 in the direction along the center axis of the peripheral wall portion 31. The second support portion 33 is formed at a position facing the connector connection space 5. In the igniter assembly 1, the connector connection space 5 easily has predetermined dimensions in the radial direction of the peripheral wall portion 31 and the direction along the center axis. Thus, the igniter assembly 1 according to the present embodiment easily has, due to the connector connection space 5, a space for forming the second support portion 33 protruding toward the inner side of the peripheral wall portion 31 in the radial direction.

In the igniter assembly 1 thus configured, when part of the resin molded article 4 forming the connector connection space 5 has a thin portion, an impact as upon actuation of the igniter body 2 is likely to produce a crack in the thinnest portion of the resin molded article 4. The thinnest portion of the resin molded article 4 is indicated by a virtual line L that is a dotted line in FIG. 2. If a crack is produced in the portion indicated by the virtual line L, the resin molded article 4 is vertically split at the virtual line L. Part of the resin molded article 4 above the virtual line L is supported by the first support portion 32, thus preventing the igniter assembly 1 from moving downward. Part of the resin molded article 4 lower than the virtual line L is supported by the second support portion 33 that is disposed below the first support portion 32, thus preventing the igniter assembly 1 from moving downward. This allows the igniter assembly 1 according to the present embodiment to prevent part of the resin molded article 4 from falling out from the igniter assembly 1 even when the resin molded article 4 is split due to a crack produced therein.

As illustrated in FIG. 2, the minimum dimension of the first support portion 32 in the direction along the center axis of the peripheral wall portion 31 is denoted by A, and the minimum dimension of the second support portion 33 in the direction along the center axis is denoted by B. In the present embodiment, the minimum dimension A of the first support portion 32 is larger than the minimum dimension B of the second support portion 33. Preferably, the minimum dimension A of the first support portion 32 is equal to or larger than the minimum dimension B of the second support portion 33. The igniter assembly 1 including the igniter collar 3 including the first support portion 32 and the second support portion 33 can prevent the igniter body 2 from falling out by using the first support portion 32 and prevent part of the resin molded article 4 from falling out from the igniter assembly 1 by using the second support portion 33. In particular, since the igniter body 2 is mainly composed of metal, to prevent the igniter body 2 from falling out, the first support portion 32 needs to have a large minimum dimension to prevent the deformation and the like. With the minimum dimension A of the first support portion 32 set to be equal to or larger than the minimum dimension B of the second support portion 33, the effect of preventing the igniter body 2 from falling out can be improved.

With the gas generator disclosed in Patent Document 1 described above, deformation of a fixing member made of metal due to a rise in pressure in a housing leads to production of a crack in a resin molded portion, and thus part of the resin molded portion falls out from the gas generator.

On the other hand, the igniter assembly according to the present embodiment can prevent part of the resin molded article 4 from falling out from the igniter assembly 1 even when a crack is produced in the resin molded article 4. Thus, with the igniter assembly 1 according to the present embodiment, pressure resistance performance can be improved.

Second Embodiment

Figure 3:
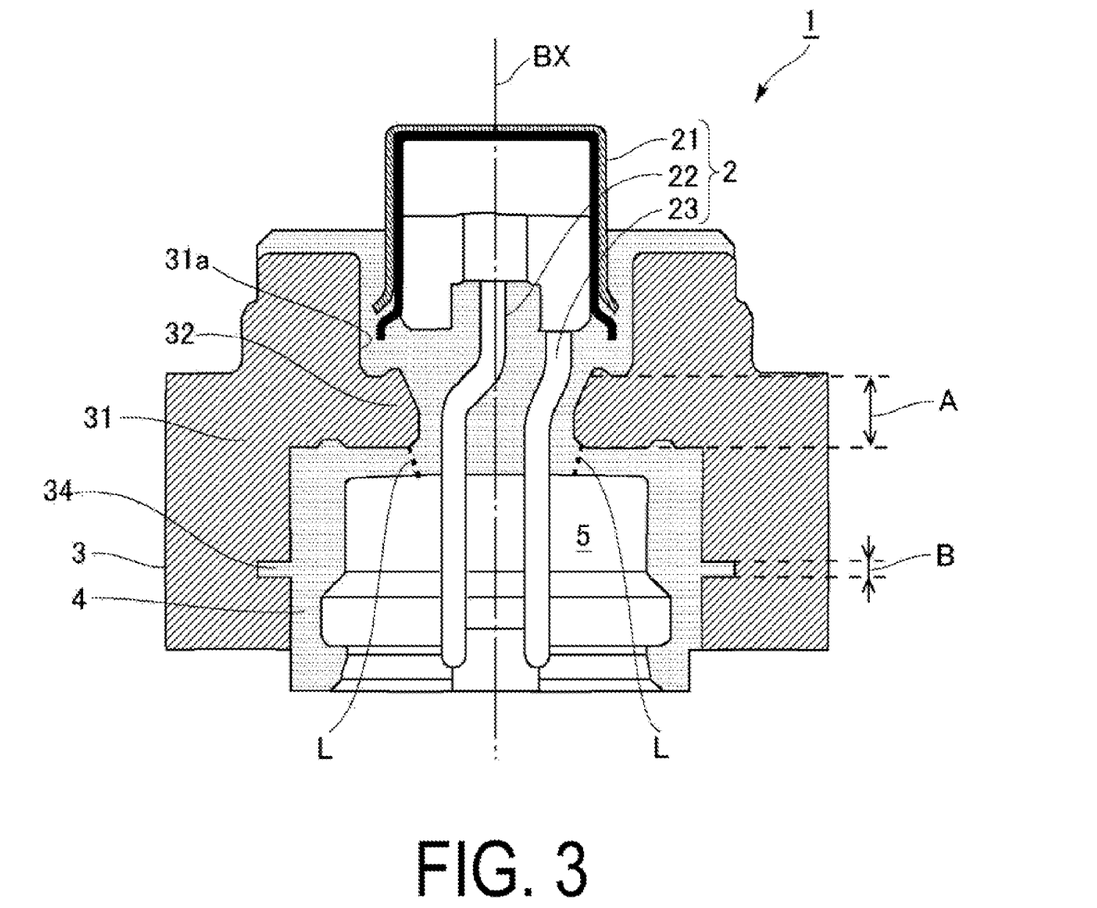
FIG. 3 is a diagram illustrating a schematic configuration of an igniter assembly according to a second embodiment.

Next, an igniter assembly 1 according to a second embodiment will be described with reference to FIG. 3. FIG. 3 is an axial cross-sectional view of the igniter assembly 1 according to the present embodiment. Note that, in FIG. 3, the same reference characters are attached to the substantially the same configurations as those in the first embodiment described above, and explanation thereof is omitted. The igniter assembly 1 according to the present embodiment illustrated in FIG. 3 has essentially the same structure as the igniter assembly 1 according to the first embodiment illustrated in FIG. 2, except for a difference in the structure of the second support portion. The igniter collar 3 of the igniter assembly 1 according to the present embodiment includes a second support portion 34 formed in a concave shape toward the outer side of the peripheral wall portion 31 in the radial direction and thus filled with the resin molded article 4. For example, the second support portion 34 is a hole formed using a drill, from the inner peripheral portion 31a side of the igniter collar 3.

In the igniter assembly 1 according to the present embodiment, part of the resin molded article 4 lower than the virtual line L is supported by the second support portion 34 that is disposed below the first support portion 32. This allows the igniter assembly 1 according to the present embodiment to prevent part of the resin molded article 4 (the portion of the resin molded article 4 forming the connector connection space) from falling out from the igniter assembly 1 even when a crack is produced in the resin molded article 4 along the virtual line L and the resin molded article 4 is split, allowing pressure resistance performance to be improved.

As illustrated in FIG. 3, the minimum dimension of the first support portion 32 in the direction along the center axis of the peripheral wall portion 31 is denoted by A, and the minimum dimension of the second support portion 34 in the direction along the center axis is denoted by B. In the present embodiment, the minimum dimension A of the first support portion 32 is larger than the minimum dimension B of the second support portion 34. Preferably, the minimum dimension A of the first support portion 32 is equal to or larger than the minimum dimension B of the second support portion 34. As in the igniter assembly 1 according to the first embodiment illustrated in FIG. 2, the igniter assembly 1 including the igniter collar 3 including the first support portion 32 and the second support portion 34 can prevent the igniter body 2 from falling out by using the first support portion 32 and prevent part of the resin molded article 4 from falling out from the igniter assembly 1 by using the second support portion 34.

The second support portion 34 formed in a concave shape may be a hole formed through the peripheral wall portion 31. This through hole may be formed in the peripheral wall portion 31 of the igniter collar 3 by punching. With the igniter assembly 1 according to the present embodiment, the second support portion 34 formed as a through hole can prevent the part of the resin molded article 4 from falling out from the igniter assembly 1. A plurality of the second support portions 34 may be discontinuously formed along the circumferential direction of the peripheral wall portion 31, regardless of whether the second support portion 34 is a non-through hole or a through hole. Thus, the resin molded article 4 can be prevented from rotating relative to the igniter collar 3 after the resin molded article 4 is cured.

First Modified Example

Figure 4:
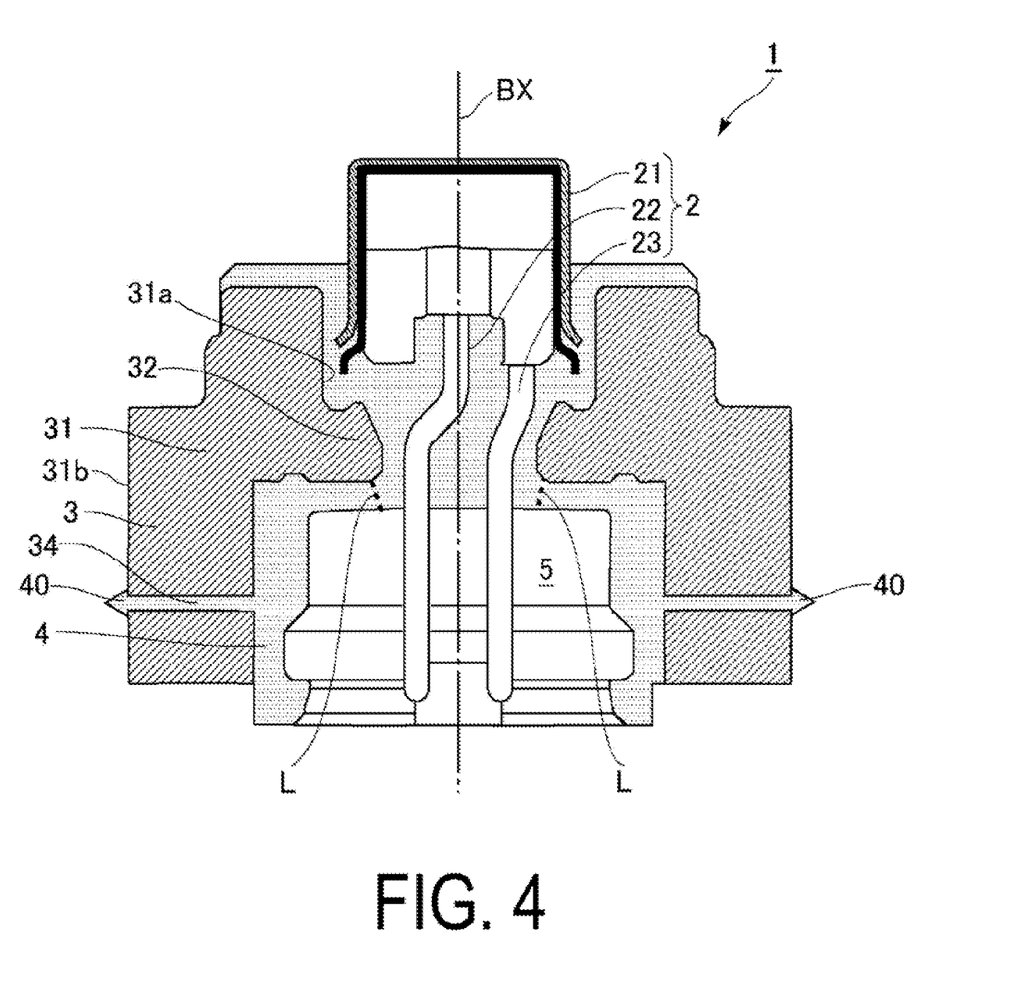
FIG. 4 is a diagram illustrating a schematic configuration of an igniter assembly according to a first modified example of the second embodiment.

Next, an igniter assembly 1 according to a first modified example of the present embodiment will be described with reference to FIG. 4. FIG. 4 is an axial cross-sectional view of the igniter assembly 1 according to the present modified example. As illustrated in FIG. 4, the second support portion 34 is formed as a through hole formed through the peripheral wall portion 31 in the present modified example. The resin molded article 4 includes a protruding portion 40 that has a triangular shape and protrudes toward the outer side from an outer peripheral portion 31b of the peripheral wall portion 31 in the radial direction, and has a triangular shape. The protruding portion 40 has a function of increasing the frictional force preventing the igniter assembly 1 from rotating relative to the inner tubular member 108, in a process of crimping the open end portion 108a after the insertion into the inner tubular member 108 of the gas generator 100 illustrated in FIG. 1. In the present modified example, the protruding portion 40 is a portion with the maximum diameter in the igniter assembly 1, and prevent the interference between the igniter collar made of metal and the inner tubular member 108 when the igniter assembly 1 is inserted in the inner tubular member 108, whereby the igniter assembly 1 can be sufficiently held and thus can be prevented from rotating relative to the gas generator 100.

Second Modified Example

Figure 5:
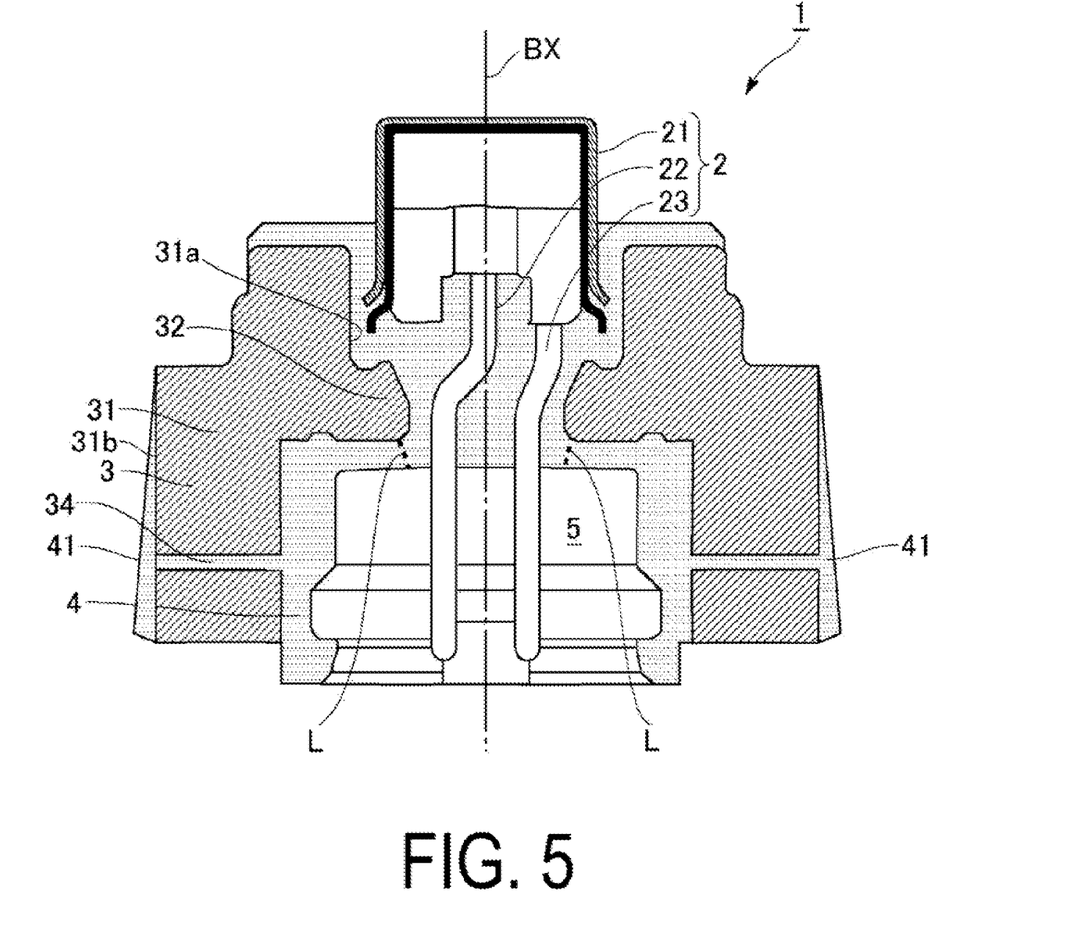
FIG. 5 is a diagram illustrating a schematic configuration of an igniter assembly according to a second modified example of the second embodiment.

Next, an igniter assembly 1 according to a second modified example of the present embodiment will be described with reference to FIG. 5. FIG. 5 is an axial cross-sectional view of the igniter assembly 1 according to the present modified example. As illustrated in FIG. 5, the second support portion 34 is formed as a through hole formed through the peripheral wall portion 31 in the present modified example. The resin molded article 4 includes a protruding portion 41 that has a triangular shape and protrudes toward the outer side from the outer peripheral portion 31b of the peripheral wall portion 31 in the radial direction. The protruding portion 41 is formed to cover the entirety of the outer peripheral portion 31b. The protruding portion 41 has a tapered shape with the diameter decreasing toward the upper side, to facilitate the insertion of the igniter assembly 1 into the inner tubular member 108. The protruding portion 41 has a function of increasing the frictional force preventing the igniter assembly 1 from rotating relative to the inner tubular member 108, in a process of crimping the open end portion 108a after the insertion into the inner tubular member 108 of the gas generator 100 as illustrated in FIG. 1, as in the case of the protruding portion 40 of the first modified example. In the present modified example, the protruding portion 41 is a portion with the maximum diameter in the igniter assembly 1, and prevent the interference between the igniter collar made of metal and the inner tubular member 108 when the igniter assembly 1 is inserted in the inner tubular member 108, whereby the igniter assembly 1 can be sufficiently held and thus can be prevented from rotating relative to the gas generator 100.

Third Embodiment

Figure 6:
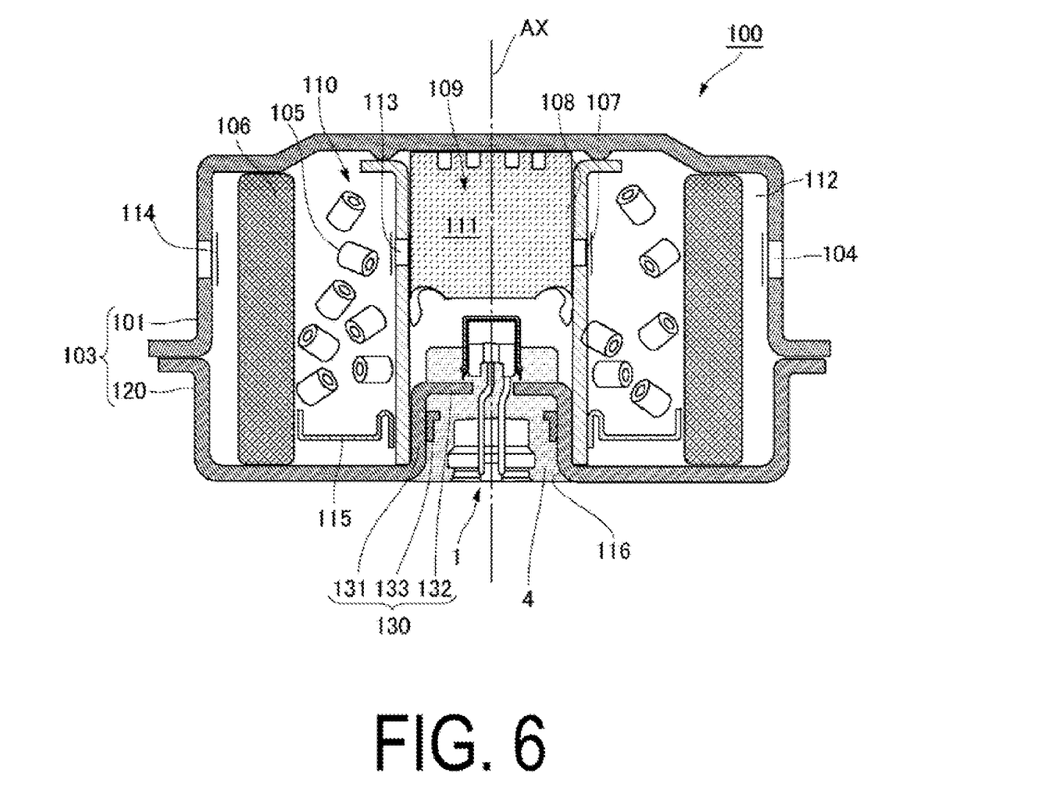
FIG. 6 is a diagram illustrating a schematic configuration of a gas generator according to a third embodiment.

Next, a gas generator 100 according to a third embodiment will be described using FIG. 6. FIG. 6 is an axial cross-sectional view of the gas generator 100 according to the present embodiment. Note that, in FIG. 6, the same reference characters are attached to the substantially same configurations as those in the first embodiment described above, and explanation thereof is omitted.

As in the first embodiment described above, the housing 103 of the gas generator 100 according to the present embodiment is formed by combining the upper shell 101 (an example of a "first shell" in the present application) and a lower shell 120 (an example of a "second shell" in the present application). The lower shell 120 is made of metal and has a bottomed substantially cylindrical shape, as in the case of the lower shell 102 in the first embodiment.

In the present embodiment, an igniter collar of the igniter assembly 1 is part of the lower shell 120. As illustrated in FIG. 6, the lower shell 120 is provided with an igniter collar 130 that extends from the attachment hole 116 toward the upper side (upper shell 101 side) in the center axis AX. The igniter collar 130 is formed to have a dimension to fit the inner side of the inner tubular member 108, and is attached to the inner peripheral surface of the inner tubular member 108 by welding or the like. As a result, the inner tubular member 108 is fixed to the igniter collar 130. The inner tubular member 108 may be fixed to the igniter collar 130 with the inner tubular member 108 crimped or press fit into the igniter collar 130. In a configuration where the igniter collar 130 is part of the lower shell 120, the igniter assembly 1 is fixed to the igniter collar 130, using the resin molded article 4.

In the present embodiment, a first support portion 132 is provided in an inner peripheral portion of a peripheral wall portion 131 of the igniter collar 130, and is formed in a convex shape toward the inner side of the peripheral wall portion 131 in the radial direction and thus buried in the resin molded article 4 at the upper end of the peripheral wall portion 131, as in the first embodiment. The first support portion 132 has the same shape and function as the first support portion 32 of the first embodiment.

The igniter collar 130 further includes a second support portion 133 that is provided at a position in the inner peripheral portion proximal to the first support portion 132 from the ignition portion in a direction along the center axis of the peripheral wall portion 131, and is formed in a convex shape toward the inner side of the peripheral wall portion 131 in the radial direction and thus buried in the resin molded article 4. The second support portion 133 is provided separately from the igniter collar 130, and is fixed to the peripheral wall portion 131 by welding or snap fitting. In a state where the second support portion 133 is fixed to the igniter collar 130, the resin molded article 4 is formed by injection molding, and thus the second support portion 133 is buried in the resin molded article 4. The second support portion 133 has the same function as the second support portion 33 in the first embodiment.

The second support portion 133 may be formed integrally with the igniter collar 130 as in the case of the second support portion 33 in the first embodiment, may be a hole formed in a concave shape toward the outer side of the peripheral wall portion 131 in the radial direction and thus filled with the resin molded article 4 as in the case of the second support portion 34 in the second embodiment, or may be a through hole.

As in the configuration where the igniter collar 130 is part of the lower shell 120, the igniter collar 130 can be provided with the first support portion and the second support portion. Thus, with the gas generator 100 according to the present embodiment, part of the resin molded article 4 can be prevented from falling out from the igniter assembly 1, whereby the pressure resistance performance can be improved.

Also in the present embodiment, the minimum dimension of the first support portion 132 is larger than the minimum dimension of the second support portion 133, in the direction along the center axis of the peripheral wall portion 131. Preferably, the minimum dimension of the first support portion 132 is equal to or larger than the minimum dimension of the second support portion 133. With the igniter collar 130, which is part of the lower shell 120, including the first support portion 32 and the second support portion 33, the igniter assembly 1 can prevent part of the resin molded article 4 from falling out from the igniter assembly 1.

Other Embodiments

Although the embodiments of the present disclosure have been described above, the various embodiments described above can be combined as much as possible. For example, the gas generators according to the embodiments and the modified examples described above have a disc shape in which a length in the axial direction (height direction) is shorter than an outer diameter in a top view. However, for example, the technique of the present disclosure may be applied to a gas generator having a cylindrical shape in which the length in the axial direction is longer than the outer diameter in a top view. The gas generator of the embodiment described above includes the gas generating agent as a gas source, but this should not be construed in a limiting sense. The gas generator may include compressed gas as the gas source. Also for the gas generator filled with the compressed gas, the igniter assembly of the embodiments described above can be used.

In the embodiments described above, the second support portions 33, 34, 133 may be continuously formed along the circumferential direction of the peripheral wall portion of the igniter collar. In the third embodiment described above, the igniter collar 130 may be part of the upper shell 101, and the igniter collar 130 part of which is the resin molded article 4 may be fixed to the upper shell 101 in the igniter assembly 1.

Each aspect disclosed in the present specification can be combined with any other feature disclosed herein.

REFERENCE SIGNS LIST

1: Igniter assembly
2: Igniter body
3: Igniter collar
4: Resin molded article
5: Connector connection space
21: Ignition portion
22: Electro-conductive pin
23: Electro-conductive pin
31: Peripheral wall portion
31a: Inner peripheral portion
31b: Outer peripheral portion
32: First support portion
33: Second support portion
100: Gas generator
101: Upper shell
102: Lower shell
103 Housing
104 Gas release opening
105 Gas generating agent
106: Filter
107: Flame transferring hole
108: Inner tubular member
109: Space
110: Combustion chamber
111: Transfer charge
112: Gap
113: Sealing tape
114: Sealing tape
115: Under plate
116: Attachment hole
120: Lower shell
130: Igniter collar
131: Peripheral wall portion
132: First support portion
133: Second support portion

What is claimed is:

1. An igniter assembly, comprising:
an igniter body including an ignition portion filled with an igniting charge and an electro-conductive portion extending from the ignition portion;
an igniter collar including a tubular peripheral wall portion that surrounds at least the electro-conductive portion of the igniter body; and
a resin molded article that is interposed between the igniter body and the igniter collar and integrates the igniter body and the igniter collar,
the igniter collar including:
a first support portion that is provided in an inner peripheral portion of the peripheral wall portion and is formed in a convex shape toward an inner side of the peripheral wall portion in a radial direction and thus buried in the resin molded article; and
a second support portion that is provided at a position in the inner peripheral portion proximal to the first support portion from the ignition portion in a direction along a center axis of the peripheral wall portion and is formed in a convex shape toward the inner side of the peripheral wall portion in the radial direction and thus buried in the resin molded article or formed in a concave shape toward an outer side of the peripheral wall portion in the radial direction and thus filled with the resin molded article, wherein
a minimum dimension of the first support portion in the direction along the center axis is equal to or larger than a minimum dimension of the second support portion in the direction along the center axis.

2. The igniter assembly according to claim 1, wherein
a connector connection space in which a connector that transmits an actuation signal for the igniter body is to be connected to the electro-conductive portion is formed on a tip side of the electro-conductive portion from the first support portion in the direction along the center axis, and the second support portion is formed in a convex shape toward the inner side of the peripheral wall portion in the radial direction and thus buried in the resin molded article and formed at a position facing the connector connection space.

3. The igniter assembly according to claim 1, wherein a plurality of the second support portions is discontinuously formed along a circumferential direction of the peripheral wall portion.

4. A gas generator, comprising:
   an outer shell container including a gas release opening; and
   the igniter assembly according to claim 1 disposed in the outer shell container.

5. The gas generator according to claim 4, wherein
   the outer shell container is formed by combining a first shell and a second shell,
   part of either the first shell or the second shell is the igniter collar, and
   the igniter assembly is fixed by the resin molded article to the first shell or the second shell part of which is the igniter collar.

\* \* \* \* \*